United States Patent [19]

Saito et al.

[11] Patent Number: 5,093,214
[45] Date of Patent: Mar. 3, 1992

[54] THIN CARBON PLATE SUITABLE FOR USE AS FUEL CELL SEPARATOR

[75] Inventors: Kazuo Saito; Yasuo Imashiro, both of Tokyo, Japan

[73] Assignee: Nisshinbo Industries, Inc., Tokyo, Japan

[21] Appl. No.: 444,399

[22] Filed: Dec. 1, 1989

[30] Foreign Application Priority Data

Dec. 2, 1988 [JP] Japan .................................. 63-304003

[51] Int. Cl.⁵ .......................... H01M 2/16; H01M 4/96
[52] U.S. Cl. ........................................ 429/44; 429/247; 423/447.2
[58] Field of Search ................ 423/447.2; 429/44, 247

[56] References Cited

U.S. PATENT DOCUMENTS

| | | | |
|---|---|---|---|
| 2,941,966 | 6/1960 | Campbell et al. | 521/108 X |
| 4,115,627 | 9/1978 | Christner et al. | 429/44 |
| 4,643,956 | 2/1987 | Sandelli | 429/247 X |
| 4,686,072 | 8/1987 | Fukuda et al. | 429/44 X |

OTHER PUBLICATIONS

Chemical Abstracts, vol. 105, No. 62108m, Murakami et al., 1986.

Primary Examiner—Stephen J. Kalafut
Attorney, Agent, or Firm—Sherman and Shalloway

[57] ABSTRACT

A thin carbon plate obtained by forming a polycarbodiimide resin or a mixture of a polycarbodiimide resin and polycarbodiimide fibers into a thin plate and carbonizing the thin plate. This thin carbon plate is suitable for use as a fuel cell separator.

25 Claims, No Drawings

THIN CARBON PLATE SUITABLE FOR USE AS FUEL CELL SEPARATOR

This invention relates to a thin carbon plate having excellent gas impermeability and mechanical strength and being particularly suitable for use as a fuel cell separator.

A phosphoric acid-type fuel cell is a typical example of the fuel cell.

The separator is an important component part of the fuel cell, and requires various properties such as gas impermeability, electrical conductivity, mechanical strength, heat resistance and chemical resistance.

Examples of conventional separators of this kind include a separator composed of a carbon powder bonded through resin, a separator composed of high-density graphite impregnated with a phenolic resin, a separator composed of a carbonied phenolic resin or furan resin, and separators composed of carbonized mixtures of these resins with graphite powder, carbon fibers, etc. From the viewpoint of electrical conductivity, the thickness of the separator plate is desirably as thin as possible. When conventional separators are formed in a thickness of about 0.2 to 1.5 mm, they have the disadvantage of undergoing degradation in mechanical strength and gas impermeability.

In order to solve this problem, the present inventors directed their attention particularly to polycarbodiimide resins which have excellent moldability into thin plates and a high carbon content after carbonization with a high yield, and extensive investigations on these resins have now led to the present invention.

In one aspect, the present invention provides a thin carbon plate, suitable for use as a fuel cell separator, which is obtained by forming a polycarbodiimide resin into a thin plate and carbonizing the thin plate.

In another aspect, the present invention provides a thin carbon plate, suitable for use as a fuel cell separator, which is obtained by forming a mixture of polycarbodiimide resin and polycarbodiimide fibers into a thin plate and carbonizing the thin plate.

The invention will be described below in detail.

The polycarbodimide resins used in this invention are known polycarbodiimide resins or those which can be produced as in the production of the known ones (See, for example, U.S. Pat. No. 2,941,966; Japanese Patent Publication No. 33279/1972; J. Org. Chem., 28, 2069-2076 (1963); and Chemical Review, 1981, Vol. 81, No. 4, 619-621]. They can be easily produced, for example, by condensation reaction of organic diisocyanates involving decarboxylation. The organic diisocyanates used in the production of the polycarbodiimide resins may be any of the aliphatic, alicyclic, aromatic, and araliphatic types. They may be used singly or in combination to form copolymers.

The polycarbodiimide resins used in the present invention include homopolymers or copolymers comprising at least one kind of recurring units represented by the following formula

—R—N=C=N—
(I)

wherein R represents an organic diisocyanate residue.

The "organic diisocyanate residue", as used herein, denotes an organic residue resulting from removal of the two isocyanate groups (NCO) from organic diisocyanate molecules. Examples of the organic diisocyante residues (R) in formula (I) include aliphatic diisocyanate residues such as alkylene group having 1 to 20 carbon atoms; alicyclic diisocyanate residues such as a cyclohexylene group,

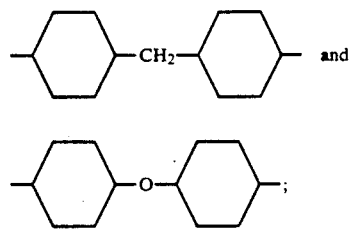

aromatic diisocyanate residues such as an optionally substituted phenylene or naphthylene group, a biphenylene group in which the benzene ring is optionally substituted, a diphenylmethane or diphenyl ether groups in which the benzene ring is optionally substituted; and araliphatic diisocyanate residues such as a xylene group.

The aromatic diisocyanate residues are preferred.

Especially preferred aromatic diisocyanate residues are those of the following formula

(II)

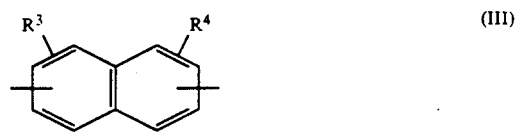

(III)

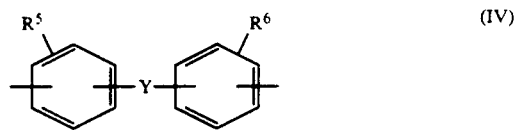

(IV)

wherein $R^1$, $R^2$, $R^3$, $R^4$, $R^5$ and $R^6$ each represent a hydrogen atom, a halogen atom, a lower alkyl group, or a lower alkoxy group; and Y represents a direct bond, a lower alkylene group, an oxygen atom, or a sulfur atom.

The term "lower", used herein to qualify a group or a compound, means that the group or compound so qualified has not more than 7, preferably not more than 4, carbon atoms.

The molecular weight of the polycarbodiimide resin used in this invention is not critical, and can be varied over a wide range. Desirably, it should generally be formable. Conveniently, it has a number average molecular weight of usually 1,000 to 1,000,000, preferably 5,000 to 500,000.

Specific examples off the polycarbodiimide resin are given below.

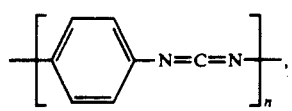

-continued

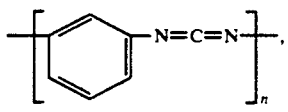

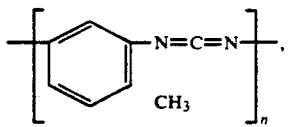

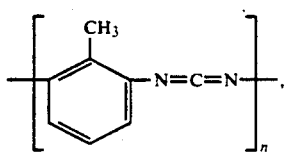

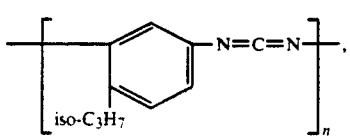

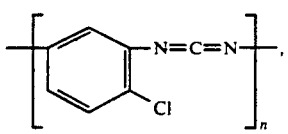

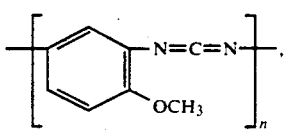

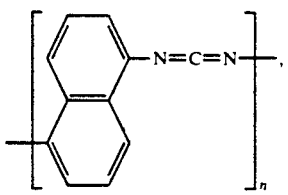

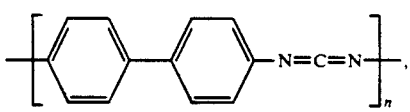

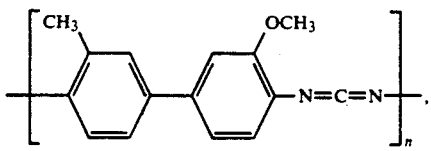

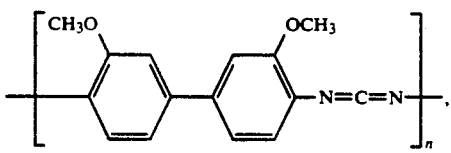

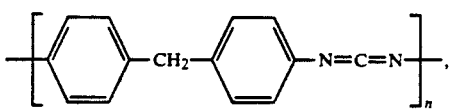

-continued

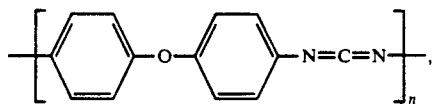

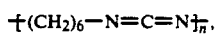

and

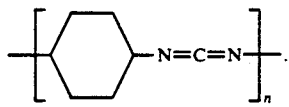

In the above formulae, n is 10 to 10,000, preferably 50 to 5,000.

The terminals of the polycarbodiimide resin may be capped with monoisocyanates, etc.

The polycarbodiimide resin described above may be used as a solution or as a powder precipitated from the solution. The resulting polycarbodiimide resin is then formed into a thin plate. This can be effected, for example, by casting the polymer solution as obtained after the end of the polymerization of the polycarbodiimide resin, or a solution of a powder obtained from the resulting polymer solution onto a flat smooth glass plate. Examples of the solvent used at this time include tetrachloroethylene, trichloroethylene, tetrahydrofuran, dioxane, monochlorobenzene, dichlorobenzene, dimethylformamide, N-methyl-2-pyrrolidone, dimethylacetamide, and dimethyl sulfoxide. The powdery polycardodiimide may be formed into a thin plate also by compression molding, roll molding, injection molding, transfer molding, etc. The suitable thickness of the thin plate so molded is 0.05 to 3.0 mm, preferably 0.1 to 1.5 mm.

The thin sheet is then heated and carbonized. Heating may be carried out in a known manner in vacuum or in a non-oxidizing atmosphere such as an inert gas to 600 to 3,000 ° C., preferably 900 to 2,000 ° C. from a range of room temperature to 200 ° C.. Temperature elevation should preferably be gradual, and the rate of temperature elevation is preferably not more than 30 ° C./min. If the heating is carried out to a temperature of at least 600 ° C., a carbonized product having substantially the desired final properties can be obtained. Better properties can be obtained preferably by heating the product to a final temperature of 900 to 2,000° C.

If the final heating temperature is less than 600° C., the electrical conductivity of the heated product is reduced. If, on the other hand, it is heated to a temperature of more than 3,000 ° C., the yield of the product tends to decrease.

Since under the aforesaid heating conditions, the final properties can substantially be obtained when the final temperature is reached, it is not necessary to further maintain the product at the finally reached temperature.

The thin carbon plate produced as mentioned above has a thickness of usually 0.05 to 3.0 mm, preferably 0.1 to 1.5 mm, and generally may have the following properties.

(1) Bulk density 1.4 to 2.0 g/cm$^3$, preferably 1.5 to 1.8 g/cm$^3$.

(2) Gas permeability $10^{-4}$ to $10^{-9}$ cc/min.cm$^2$, preferably $10^{-5}$ to cc/min.cm$^2$ (measured at room temperature and a differential pressure of 1 atmosphere with N$_2$ gas)

(3) Inherent resistivity 0.9 to 8.0 m-ohm.cm, preferably 1.0 to 6.0 m

(4) Tensile strength 10 to 50 kg/mm$^2$, preferably 15 to 30 kg/mm$^2$

(5) Young's modulus 1,000 to 4,000 kg/mm$^2$, preferably 2,000 to 3,500 kg/mm$^2$ The thin carbon plate in accordance with this invention also has excellent phosphoric acid resistance. The thin carbon plate of the invention having the above properties may be used directly as a separator for a fuel cell. It has been found that when polycarbodiimide fibers are mixed with the polycarbodiimide resin and the mixture is formed into a thin plate and heated and carbonized as stated above, a thin carbon plate having enhanced mechanical strength can be obtained.

The polycarbodiimide fibers used in this invention may be obtained by fiberizing the polycarbodiimide resin, for example, by melt-spinning, dry-spinning or wet-pinning the polycarbodiimide resin having a molecular weight of 10,000 to several hundred thousand in a customary manner.

The polycarbodiimide fibers generally have a fiber diameter of 0.5 to 100 micrometers, preferably 1.0 to 50 micrometers and a fiber length of 0.1 to 100 mm, preferably 0.5 to 50 mm.

Desirably, the mixing of the polycarbodiimide resin and the polycarbodiimide fibers is carried out until a homogeneous mixture results. If the resin to be mixed is a powder, the mixing may be carried out by using, for example, a ball mill. If the fibers are added to a solution of the resin, the mixing may be carried out with stirring by using a mixer. The resin forming the polycarbodiimide fibers to be mixed may be the same as, or different from, the polycarbodiimide resin as a matrix. Generally, the resin forming the fibers is preferably the same as the matrix polycarbodiimide resin. The mixing ratio of the polycarbodiimide fibers to the polycarbodiimide resin is not critical. The suitable weight ratio of the polycarbodiimide fibers to the polycarbodiimide resin is generally from 5:95 to 60:40, preferably from 10:90 to 50:50.

The mixture of the polycarbodiimide resin and the polycarbodiimide fibers produced in this manner is then formed into a thin plate, and then heated and carbonized, in the same way as described above with regard to the first aspect of the invention, to produce a thin carbon plate.

The resulting thin carbon plate has a thickness of usually 0.1 to 3.0 mm, preferably 0.1 to 1.5 mm, and may generally have the following properties.

(1) Bulk density 1.4 to 2.0 g/cm$^3$, preferably 1.5 to 1.8 g/-cm$^3$.

(2) Gas permeability $10^{-4}$ to $10^{-9}$ cc/min.cm$^2$, preferably $10^{-5}$ to cc/min cm$^2$ (measured at room temperature and a differential pressure of 1 atmosphere with N$_2$ gas)

(3) Inherent resistivity 0.9 to 8.0 m-ohm.cm, preferably 1.0 to 6.0 mohm.cm

(4) Flexural strength 700 to 2,000 kg/cm$^2$, preferably 900 to 1,800 kg/cm$^2$ The above thin carbon plate also has excellent phosphoric acid resistance.

The thin carbon plate produced in the second aspect of the invention can also be advantageously used as a fuel cell separator.

The following examples illustrate the present invention more specifically.

EXAMPLE 1

Fifty-four grams of a mixture of 2,4-tolyelene diisocyanate and 2,6-tolyene diisocyanate in a weight ratio of 80:20 was reacted in 500 ml of tetrachloroethylene together with 0.12 g of a carbodiimidation catalyst (1-phenyl-3-methylphospholene oxide; the same catalyt was used throughout the following examples; to be referred to simply as the "catalyst" hereinafter) at 120° C. for 4 hours to give a polycarbodiimide solution. From the solution, a polycarbodiimide plate having a thickness of 200 micrometers was prepared by a dry method.

The thin plate was heated and carbonized in a stream of an inert gas to 1,000° C. from room temperature at a temperature elevating rate of 10° C./min., and immediately then, allowed to cool to room temperature to give a thin carbon plate having a thickness of 180 micrometers.

The properties of the thin carbon plate are shown in Table 1.

EXAMPLE 2

Fifty grams of methylenediphenyl diisocyanate (MDI)- was reacted in 880 ml of tetrahydrofuran together with 0.13 g of the catalyst at 68° C. for 12 hours to give a polycarbodiimide solution. The solution was spread onto a glass plate, and by a drying method, a polycarbodiimide film having a thickness of 200 micrometers was obtained. The film was heated in N$_2$ to 1,000° C. from room temperature at a temperature elevating rate of 10° C./min, and immediately then, allowed to cool to give a thin carbon plate having a thickness of 180 micrometers. Its properties are shown in Table 1.

EXAMPLE 3

Fifty grams of diphenyl ether diisocyanate was reacted in 850 ml of tetrahydrofuran together with 0.13 g of the catalyst at 68° C. for 12 hours to give a polycarbodiimide solution. The solution was spread onto a glass plate, and by a drying method, a polycarbodiimide film having a thickness of 200 micrometers was obtained. The film was heated in N$_2$ to 1,000° C. from room temperature at a temperature elevating rate of 10° C./min., and immediately then, allowed to cool to give a thin carbon plate having a thickness of 180 micrometers. Its properties are shown in Table 1.

EXAMPLE 4

Fifty grams of o-tolidine diisocyanate was reacted in 850 ml of chlorobenzene-THF (1:1) together with 0.13 g of the catalyst at 85° C. for 10 hours to give a polycarbodiimide solution. The solution was spread onto a glass plate, and by a drying method, a polycarbodiimide film having a thickness of 200 micrometers was obtained.

The film was heated in $N_2$ to 1,000 °C. from room temperature at a temperature elevating rate of 10 °C./min., and immediately then, allowed to cool to give a thin carbon plate having a thickness of 180 micrometers. Its properties are shown in Table 1.

EXAMPLE 5

Fifty grams of 1-methoxy-2,4-phenylene diisocyanate was reacted in 850 ml of a 1:1 mixed solvent of tetrachloroethylene and dioxane together with 0.13 g of the catalyst at 120 °C. for 4 hours to give a polycarbodiimide solution. The solution was spread onto a glass plate, and by a drying method, a polycarbodiimide film having a thickness of 200 micrometers was obtained. The film was heated in $N_2$ to 1,000 °C. from room temperature at a temperature elevating rate of 10 °C./min., and immediately then, allowed to cool to give a thin carbon plate having a thickness of 180 micrometers. Its properties are shown in Table 1.

EXAMPLE 6

Fifty grams of p-phenylene diisocyanate was reacted in 880 ml of tetrahydrofuran together with 0.13 g of the catalyst at 68 °C. for 5 hours. The resulting solution was cooled to room temperature to precipitate polycarbodiimide. The precipitate was filtered and dried at 100 °C. for 2 hours to give a polycarbodiimide powder. The powder was press-formed under a pressure of 80 kg/cm$^2$ at a press temperature of 180 °C. to give a thin plate having a thickness of 500 micrometers. The thin plate was heated in $N_2$ to 1,000 °C. from room temperature at a temperature elevating rate of 5° C./min., and immediately then, allowed to cool to give a thin carbon plate having a thickness of 420 micrometers. Its properties are shown in Table 1.

EXAMPLE 7

Fifty grams of naphthylene diisocyanate was reacted in 880 ml of tetrahydrofuran together with 0.13 g of the catalyst at 70 °C. for 8 hours, and by the same method as in Example 6, a polycarbodiimide powder was obtained. The powder was press-formed under a pressure of 80 kg/cm$^2$ at a press temperature of 160 °C. to give a thin plate having a thickness of 500 micrometers. The thin plate was heated in $N_2$ to 1,000° C. from room temperature at a temperature elevating rate of 5° C./min to give a thin carbon plate having a thickness of 420 micrometers. Its properties are shown in Table 1.

EXAMPLE 8

Fifty grams of MDI was reacted in 820 ml of tetrachloroethylene together with 0.13 g of the catalyst at 120 °C. for 6 hours, and by the same method as in Example 6, a polycarbodiimide powder was obtained. The powder was press-formed under a pressure of 80 kg/cm$^2$ at a press temperature of 160° C. to give a thin plate having a thickness of 500 micrometers. The thin plate was heated in $N^2$ to 1,000° C. from room temperature at a temperature elevating rate of 5° C./min to give a thin carbon plate having a thickness of 420 micrometers. Its properties are shown in Table 1.

EXAMPLE 9

The polycarbodiimide powder obtained in Example 8 was press-formed under a pressure of 80 kg/cm$^2$ at a press temperature of 160 °C. to give a thin plate having a thickness of 1 mm. The thin plate was heated in $N_2$ to 1,000° C. from room temperature at a temperature elevating rate of 5° C./min to give a thin carbon plate having a thickness of 840 micrometers. Its properties are shown in Table 1.

EXAMPLE 10

Fifty grams of MDI and 5 g of phenyl isocyanate as an end capping agent were reacted in 880 ml of tetrahydrofuran together with 0.13 g of the catalyst at 68° C. for 12 hours to give a polycarbodiimide solution. The solution was spread onto a glass plate, and by a drying method, a polycarbodiimide film having a thickness of 200 micrometers was obtained. The film was heated in $N_2$ to 1,000° C. from room temperature at a temperature elevating rate of 10 °C./min, and immediately then, allowed to cool to give a thin carbon plate having a thickness of 180 micrometers. Its properties are shown in Table 1.

EXAMPLE 11

A film having a thickness of 500 micrometers was obtained by a drying method from the polycarbodiimide solution prepared in Example 1. The film was heated in $N_2$ to 1,500° C. from room temperature at a temperature elevating rate of 10° C./min., and immediately then, allowed to cool to give a thin carbon plate having a thickness of 450 micrometers. Its properties are shown in Table 1.

EXAMPLE 12

A thin plate having a thickness of 2 mm was produced by a drying method from the polycarbodiimide solution obtained in Example 1. The film was heated in vacuum to 1,000 °C. from room temperature at a temperature elevating rate of 1 °C./min., and immediately then, allowed to cool to give a thin carbon plate having a thickness of 1.8 mm. Its properties are shown in Table 1.

COMPARATIVE EXAMPLE 1

Data of a 1 mm thick commercial fuel cell separator (GC Composite, produced by Kobe Steelmaking Co., Ltd.) are shown also in Table 1.

EXAMPLE 13

Fifty grams of MDI was reacted in 820 ml of tetrachloroethylene together with 0.13 g of the catalyst at 120° C. for 6 hours. When the solution was cooled to room temperature, polycarbodiimide was precipitated. The precipitated was filtered, and dried at 100 °C. for 2 hours to give a polycarbodiimide powder.

The powder was melt-spun at 120 °C. to give polycarbodiimide fibers having a diameter of 10 micrometers. The fibers were cut to a length of 10 mm (I), 5 mm (II) and 1 mm (III), respectively.

The polycarbodiimide powder, 70 % by weight, and the fibers (I), 30 % by weight, were mixed, and the mixture was press-formed under a pressure of 80 kg/cm$^2$ at a pressing temperature of 160 °C. to give a thin plate having a thickness of 800 micrometers. The thin plate was then heated in $N_2$ to 1,000° C. from room temperature at a temperature elevating rate of 1° C./min., and immediately then, allowed to cool to give a thin carbon plate having a thickness of 720 micrometers. Its properties are shown in Table 2.

EXAMPLE 14

The powder (70 % by weight) and 30 % by weight of the fibers (II) prepared in Example 13 were mixed, and processed in the same way as in Example 13 to give a thin carbon plate having a thickness of 720 micrometers. Its properties are shown in Table 2.

EXAMPLE 15

The powder (70 % by weight) and 30 % by weight of the fibers (III) prepared in Example 13 were mixed, and processed in the same way as in Example 13 to give a thin carbon plate having a thickness of 720 micrometers. Its properties are shown in Table 2.

EXAMPLE 16

The powder (40 % by weight) and 60 % by weight of the fibers (III) prepared in Example 13 were mixed, and processed in the same way as in Example 13 to give a thin carbon plate having a thickness of 720 micrometers. Its properties are shown in Table 2.

EXAMPLE 17

The powder (50 % by weight) and 50 % by weight of the fibers (III), prepared in Example 13, were mixed, and the mixture was press-formed in the same way as in Example 13 to give a thin plate having a thickness of 1 mm. The thin plate was then heated in $N_2$ to 1,500 ° C. from room temperature at a temperature elevating rate of 1° C./mm, and immediately then, allowed to cool to give a thin carbon plate having a thickness of 800 micrometers. Its properties are shown in Table 2.

EXAMPLE 18

Fifty grams of p-phenylene diisocyanate was reacted in 880 ml of tetrahydrofuran together with 0.13 g of the catalyst at 68 ° C. for 5 hours, and by the same way as in Example 13, a polycarbodiimide powder was obtained. The resulting powder (60 % by weight) was mixed with 40 % by weight of the fibers (III) obtained in Example 13. The mixture was press-formed under a pressure of 80 kg/cm$^2$ at a press temperature of 180° C. to give a thin plate having a thickness of 800 micrometers. The thin plate was carbonized in the same way as in Example 13 to give a thin carbon plate having a thickness of 720 micrometers. Its properties are shown in Table 2.

EXAMPLE 19

Fifty grams of naphthylene diisocyanate was reacted in 880 ml of tetrahydrofuran together with 0.13 g of the catalyst at 70 ° C. for 8 hours, and by the same method as in Example 13, a polycarbodiimide powder was obtained. The resulting powder (60 % by weight) and 40 % by weight of the fibers (III) obtained in Example 13 were mixed, and molded and carbonized as in Example 13 to give a thin carbon plate having a thickness of 720 micrometers. Its properties are shown in Table 2.

EXAMPLE 20

The same polycarbodiimide solution as obtained in Example 1 was dry-spun to form polycarbodiimide fibers having a diameter of 20 micrometers. The fibers were cut to a length of 1 mm to give polycarbodiimide fibers (IV). The above polycarbodiimide solution (60 parts by weight as the resin solids) was mixed with 40 parts by weight of the fibers (IV), and a thin plate having a thickness of 500 micrometers was prepared from the mixture by a dry method. The thin plate was carbonized as in Example 13 to give a thin carbon plate having a thickness of 450 micrometers. Its properties are shown in Table 2.

EXAMPLE 21

The powder (50 % by weight) prepared in Example 13 and 50 % by weight of the fibers (IV) prepared in Example 20 were mixed, and molded and carbonized by the same method as in Example 13 to give a thin carbon plate having a thickness of 720 micrometers. Its properties are shown in Table 2.

EXAMPLE 22

Fifty grams of diphenyl ether diisocyanate was reacted in 850 ml of tetrahydrofuran together with 0.13 g of the catalyst at 68 ° C. for 12 hours to give a polycarbodiimide solution.

The solution (60 % by weight as the resin solids) and 40 % by weight of the fibers (III) as described in Example 13 were mixed. The mixture was molded and carbonized as in Example 20 to give a thin carbon plate having a thickness of 450 micrometers. Its properties are shown in Table 2.

EXAMPLE 23

Fifty grams of MDI was reacted in 880 ml of tetrahydrofuran together with 0.13 g of the catalyst at 68 ° C. for 12 hours to give a polycarbodiimide solution.

The resulting solution (60 % by weight as the resin solid) was mixed with 40 % by weight of the fibers (III) prepared in Example 13. The mixture was molded and carbonized as in Example 20 to give a thin carbon plate having a thickness of 450 micrometers. Its properties are shown in Table 2.

EXAMPLE 24

Fifty grams of MDI and 5 g of phenyl isocyanate as an end capping agent were reacted in 800 ml of tetrachloroethylene together with 0.13 g of the catalyst at 120 ° C. for 8 hours, and in the same way as in Example 13, a polycarbodiimide powder was obtained.

The resulting powder (50 % by weight ) was mixed with 50 % by weight of the fibers (III) prepared in Example 13. The mixture was molded and carbonized as in Example 13 to give a thin carbon plate having a thickness of 720 micrometers. Its properties are shown in Table 2.

COMPARATIVE EXAMPLE 2

The powder of Example 13 (10 % by weight) and 90 % by weight of the fibers obtained in Example 13 were mixed. The mixture was molded and carbonized as in Example 13 to give a thin carbon plate having a thickness of 720 micrometers. Its properties are shown in Table 2.

COMPARATIVE EXAMPLE 3

The powder (60 % by weight) of Example 13 was mixed with 40 % by weight of PAN-type carbon fibers (diameter 7 micrometers, length 1 mm). The mixture was molded and carbonized as in Example 13 to give a thin carbon plate. Its properties are shown in Table 2.

TABLE 1

Results of Example 1 to 12 and Comparative Example 1

| | Bulk density (g/cm³) | Gas permeability[1] (cc/min·cm²) | Inherent resistivity (m-ohm·cm) | Tensile strength | Young's modulus (kg/mm²) | Phosphoric acid resistance[2] |
|---|---|---|---|---|---|---|
| Example 1 | 1.70 | $3.0 \times 10^{-6}$ | 3.5 | 25 | 3000 | ◯ |
| Example 2 | 1.68 | $2.7 \times 10^{-6}$ | 4.5 | 21 | 2900 | ◯ |
| Example 3 | 1.72 | $2.5 \times 10^{-6}$ | 3.0 | 20 | 3100 | ◯ |
| Example 4 | 1.69 | $2.7 \times 10^{-6}$ | 3.2 | 23 | 2800 | ◯ |
| Example 5 | 1.68 | $3.2 \times 10^{-6}$ | 5.0 | 20 | 2800 | ◯ |
| Example 6 | 1.70 | $9.2 \times 10^{-7}$ | 3.0 | 25 | 3000 | ◯ |
| Example 7 | 1.66 | $1.0 \times 10^{-6}$ | 4.8 | 20 | 2700 | ◯ |
| Example 8 | 1.70 | $1.2 \times 10^{-6}$ | 3.0 | 19 | 2600 | ◯ |
| Example 9 | 1.70 | $6 \times 10^{-7}$ | 3.8 | 19 | 2500 | ◯ |
| Example 10 | 1.68 | $2.7 \times 10^{-6}$ | 4.5 | 20 | 2800 | ◯ |
| Example 11 | 1.70 | $1.2 \times 10^{-6}$ | 1.8 | 25 | 3000 | ◯ |
| Example 12 | 1.70 | $3.0 \times 10^{-7}$ | 5.0 | 22 | 2800 | ◯ |
| Comp. Example 1 | 1.53 | $2.0 \times 10^{-5}$ | 3.3 | 4.25 | 2300 | ◯ |

[1] Differential pressure 1 atm., N₂ gas, room temperature
[2] Immersed in 100% phosphoric acid at 200° C. for 1000 hours, and then changes in appearance were observed by visual observation.

TABLE 2

Results of Examples 13 to 24 and Comparative Examples 2 to 3

| | Bulk density (g/cm³) | Gas permeability[1] (cc/min·cm²) | Inherent resistivity (m-ohm·cm) | Flexural strength (kg/cm²) | Phosphoric acid resistance[2] |
|---|---|---|---|---|---|
| Example 13 | 1.68 | $1.2 \times 10^{-6}$ | 4.0 | 1050 | ◯ |
| Example 14 | 1.68 | $9.8 \times 10^{-7}$ | 4.1 | 1200 | ◯ |
| Example 15 | 1.68 | $9.9 \times 10^{-7}$ | 4.0 | 1300 | ◯ |
| Example 16 | 1.68 | $1.2 \times 10^{-6}$ | 4.0 | 1380 | ◯ |
| Example 17 | 1.67 | $8.0 \times 10^{-7}$ | 3.9 | 1500 | ◯ |
| Example 18 | 1.70 | $2.0 \times 10^{-6}$ | 4.5 | 1200 | ◯ |
| Example 19 | 1.68 | $3.0 \times 10^{-6}$ | 4.6 | 1000 | ◯ |
| Example 20 | 1.71 | $3.0 \times 10^{-6}$ | 4.0 | 1300 | ◯ |
| Example 21 | 1.70 | $2.9 \times 10^{-6}$ | 4.0 | 1100 | ◯ |
| Example 22 | 1.69 | $3.3 \times 10^{-6}$ | 4.1 | 1050 | ◯ |
| Example 23 | 1.69 | $2.0 \times 10^{-6}$ | 4.0 | 1300 | ◯ |
| Example 24 | 1.66 | $3.2 \times 10^{-6}$ | 4.0 | 1040 | ◯ |
| Comp. Example 2 | 1.45 | $8.0 \times 10^{-4}$ | 10.0 | 700 | ◯ |
| Comp. Example 3 | 1.47 | $2.0 \times 10^{-5}$ | 3.3 | 850 | ◯ |

[1] and [2]: Same as footnote to Table 1.

We claim:

1. A thin carbon plate obtained by forming a polycarbodiimide resin into a thin plate and carbonizing the thin plate.

2. The thin carbon plate of claim 1 in which the polycarbodiimide resin is a homopolymer or a copolymer comprising at least one kind of recurring units represented by the formula $$-R-N=C=N-$$

wherein R represents an organic diisocyanate residue.

3. The thin carbon plate of claim 2 in which R represents an aliphatic diisocyanate residue, an alicyclic diisocyanate residue, an aromatic diisocyanate residue or an araliphatic diisocyanate residue.

4. The thin carbon plate of claim 1 in which R represents an aromatic diisocyanate residue.

5. The thin carbon plate of claim 4 in which the aromatic diisocyanate residue is selected from the class consisting of

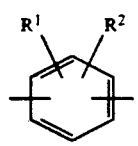

(II)

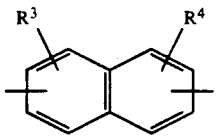

(III)

and

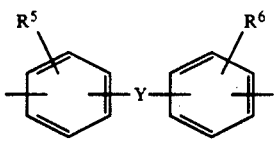

(IV)

wherein $R^1$, $R^2$, $R^3$, $R^4$, $R^5$ and $R^6$ each represent a hydrogen atom, a halogen atom, a lower alkyl group, or a lower alkoxy group; and Y represents a direct bond, a lower alkylene group, an oxygen atom, or a sulfur atom.

6. The thin carbon plate of claim 1 in which the polycarbodiimide resin has a number average molecular weight of 1,000 to 1,000,000.

7. The thin carbon plate of claim 1 which has a bulk density of 1.4 to 2.0 g/cm³.

8. The thin carbon plate of claim 1 which has a gas permeability, measured at room temperature and a differential pressure of 1 atmosphere with N₂ gas, of $10^{-5}$ to cc/min.cm².

9. The thin carbon plate of claim 1 which has an inherent resistivity of 0.9 to 8.0 m-ohms.cm.

10. The thin carbon plate of claim 1 which has a tensile strength of 10 to 50 kg/mm$^2$.

11. The thin carbon plate of claim 1 which has a Young's modulus of 1,000 to 4,000 kg/mm$^2$.

12. A fuel cell separator composed of the thin carbon plate of claim 1.

13. A thin carbon plate obtained by forming a mixture of a polycarbodiimide resin and polycarbodiimide fibers into a thin plate, and carbonizing the thin plate.

14. The thin carbon plate of claim 13 in which the polycarbodiimide resin and the polycarbodiimide resin constituting the polycarbodiimide fibers are each a homopolymer or a copolymer comprising at least one kind of recurring units represented by the formula

—R—N=C=N— wherein R represents an organic diisocyanate residue.

15. The thin carbon plate of claim 14 in which R represents an aliphatic diisocyanate residue, an alicyclic diisocyanate residue, an aromatic diisocyanate residue or an araliphatic diisocyanate residue.

16. The thin carbon plate of claim 13 in which R represents an aromatic diisocyanate residue.

17. The thin carbon plate of claim 16 in which the aromatic diisocyanate residue is selected from the class consisting of

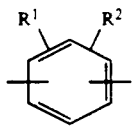
(II)

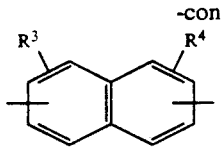
(III)

and

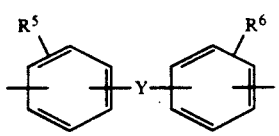
(IV)

wherein $R^1$, $R^2$, $R^3$, $R^4$, $R^5$ and $R^6$ each represent a hydrogen atom, a halogen atom, a lower alkyl group, or a lower alkoxy group; and Y represents a direct bond, a lower alkylene group, an oxygen atom, or a sulfur atom.

18. The thin carbon plate of claim 13 in which the polycarbodiimide resin has a number average molecular weight of 1,000 to 1,000,000.

19. The thin carbon plate of claim 13 in which the polycarbodiimide fibers have a diameter of 0.5 to 100 μm and a length of 0.1 to 100 mm.

20. The thin carbon plate of claim 13 in which the weight ratio of the polycarbodiimide fibers to the polycarbodiimide resin is from 5:95 to 60:40.

21. The thin carbon plate of claim 13 which has a bulk density of 1.4 to 2.0 g/cm$^3$.

22. The thin carbon plate of claim 13 which has a gas permeability, measured at room temperature and a differential pressure of 1 atmosphere with $N_1$ gas, of $10^{-4}$ to $10^{-9}$ cc/min.cm$^2$.

23. The thin carbon plate of claim 13 which has a inherent resistivity of 0.9 to 8.0 m-ohms.cm.

24. The thin carbon plate of claim 13 which has a flexural strength of 700 to 2,000 kg/mm$^2$.

25. A fuel cell separator composed of the thin carbon plate of claim 13.